US009350449B2

(12) United States Patent  
Haruyama et al.

(10) Patent No.: US 9,350,449 B2  
(45) Date of Patent: May 24, 2016

(54) VISIBLE LIGHT COMMUNICATION DEVICE, LIGHTING FIXTURE INCLUDING THE SAME, AND LIGHTING SYSTEM

(71) Applicant: Panasonic Corporation, Osaka (JP)

(72) Inventors: Shinichiro Haruyama, Kanagawa (JP); Shuji Suzuki, Kanagawa (JP); Shojirou Kido, Osaka (JP); Eiji Shiohama, Osaka (JP)

(73) Assignee: Panasonic Corporation, Osaka (JP)

( * ) Notice: Subject to any disclaimer, the term of this patent is extended or adjusted under 35 U.S.C. 154(b) by 7 days.

(21) Appl. No.: 14/325,431

(22) Filed: Jul. 8, 2014

(65) Prior Publication Data

US 2015/0016825 A1  Jan. 15, 2015

(30) Foreign Application Priority Data

Jul. 10, 2013  (JP) ................. 2013-144977

(51) Int. Cl.
*H04B 10/00* (2013.01)
*H04B 10/116* (2013.01)

(52) U.S. Cl.
CPC .................. *H04B 10/116* (2013.01)

(58) Field of Classification Search
USPC ........................................ 398/172
See application file for complete search history.

(56) References Cited

U.S. PATENT DOCUMENTS

| | | | | |
|---|---|---|---|---|
| 5,657,145 A * | 8/1997 | Smith | ........... | H04B 10/114 375/238 |
| 7,548,698 B2 * | 6/2009 | Yamamoto | ........ | H04B 10/1149 398/127 |
| 8,521,035 B2 * | 8/2013 | Knapp | ........... | H04L 12/43 315/158 |
| 8,594,509 B2 * | 11/2013 | Shin | ........... | H04B 10/1149 398/118 |
| 8,699,887 B1 * | 4/2014 | Rothenberg | ......... | H04B 10/116 315/158 |
| 8,849,127 B2 * | 9/2014 | Yamada | ............. | H04B 10/116 398/172 |
| 8,942,572 B2 * | 1/2015 | Rothenberg | ......... | H04B 10/116 315/158 |
| 8,995,840 B2 * | 3/2015 | Shin | ............. | H04B 10/1149 398/118 |
| 9,042,738 B2 * | 5/2015 | Schenk | ............. | H04B 10/1149 398/118 |
| 2004/0101312 A1 * | 5/2004 | Cabrera | ............. | H04B 10/116 398/172 |
| 2009/0022496 A1 * | 1/2009 | Shin | ............. | H04B 10/116 398/118 |
| 2010/0254712 A1 * | 10/2010 | Linnartz | ............. | H04B 10/116 398/172 |
| 2011/0170872 A1 * | 7/2011 | Shin | ............. | H04B 10/1149 398/78 |
| 2012/0051757 A1 * | 3/2012 | Nishino | ............. | H04B 10/1149 398/201 |
| 2014/0270794 A1 * | 9/2014 | Rothenberg | ......... | H04B 10/116 398/118 |
| 2014/0334825 A1 * | 11/2014 | Pandharipande | ... | H04L 12/6418 398/128 |
| 2015/0016825 A1 * | 1/2015 | Haruyama | ........... | H04B 10/116 398/118 |
| 2015/0207561 A1 * | 7/2015 | Shin | ............. | H04B 10/1149 398/118 |

FOREIGN PATENT DOCUMENTS

| | | |
|---|---|---|
| JP | 2006-203669 A | 8/2006 |
| JP | 2007-124405 A | 5/2007 |
| JP | 2009-005304 A | 1/2009 |
| JP | 2011-130304 A | 6/2011 |
| JP | 2012-069505 A | 4/2012 |

\* cited by examiner

*Primary Examiner* — Agustin Bello (74) *Attorney, Agent, or Firm* — Renner, Otto, Boisselle & Sklar, LLP (57) ABSTRACT

The visible light communication device includes a control circuit configured to repeat a transmission process of transmitting a communication signal through modulating an intensity of visible light to be emitted from a light source. The control circuit is configured to, in the transmission process, arbitrarily select a time slot for transmission from a plurality of time slots set within a predetermined time period allocated to the transmission process, and transmit the communication signal in the time slot for transmission.

15 Claims, 8 Drawing Sheets

VISIBLE LIGHT COMMUNICATION DEVICE, LIGHTING FIXTURE INCLUDING THE SAME, AND LIGHTING SYSTEM

CROSS-REFERENCE TO RELATED APPLICATIONS

The application is based upon and claims the benefit of priority from Japanese Patent Application No. 2013-144977, filed on Jul. 10, 2013, the entire contents of which are incorporated herein by reference.

TECHNICAL FIELD

The disclosure relates to a visible light communication device for communication using visible light as a medium, a lighting fixture including the same, and a lighting system.

BACKGROUND ART

In the past, there has been proposed a lighting fixture that includes a light source constituted by at least one light emitting diode (LED) and sends a signal by modulating an intensity of illuminating light. Such a lighting fixture is disclosed in document 1 (JP 2012-069505 A), for example. This type of illuminating light communication device modulates the illuminating light itself, and thereby sends a signal. Hence, a special device such as an infrared communication device is unnecessary. Further, use of light emitting diodes as lighting sources for illumination can save electric power. For these reasons, it is being planned to use the aforementioned illuminating light communication device in a ubiquitous information system installed in premises such as an underground mall.

The illuminating light communication device disclosed in document 1 includes a constant current source, a smoothing capacitor, a load circuit, a load variable element, a signal generation circuit, and a switching element. The smoothing capacitor smooths output from the constant current source. The load circuit includes a plurality of light emitting diodes and is to receive the output from the constant current source. The load variable element is constituted by a resistor connected in parallel with one or some of the light emitting diodes. When the load variable element is connected to the load circuit, load characteristics of the load circuit are changed partially. The signal generation circuit is to generate a binary communication signal. The switching element is a switching device connected in series with the resistor serving as the load variable element. To select whether the load variable element is connected to the load circuit, the switching element is turned on and off depending on the communication signal. Accordingly, the load characteristics of the load circuit is varied in accordance with the communication signal, and therefore the load current flowing through the light emitting diode is modulated with a waveform of the communication signal.

However, as for a lighting fixture including the illuminating light communication device of the background art, the following undesired situation may occur. Namely, in a case where a plurality of lighting fixtures are installed so as to illuminate a large space such as an underground mall for example, when rays of illuminating light from the plurality of lighting fixtures overlap each other, such rays of illuminating light interfere with each other, and therefore a receiving terminal such as a mobile phone fails to successfully receive the communication signal. This is because that the illuminating light communication device of the background art sends the communication signals consecutively.

To avoid such an undesired situation, for example, there has been proposed a system in which the lighting fixtures are connected to each other by signal lines, and synchronization signals are given to the lighting fixtures to allow the lighting fixtures to transmit the communication signals at different timings to avoid interference. However, according to this proposal, it is troublesome to construct the system when the lighting fixtures are situated in places where connection of the signal lines is difficult. Moreover, the system is not available for the lighting fixtures which are devoid of components to be connected to the signal lines. Additionally, according to this system, it is necessary to add the signal lines to provide the synchronization signals to the illuminating light communication devices, and therefore the installation of the system is troublesome and also it is difficult to install the system especially in large-scale premises.

SUMMARY

In view of the above insufficiency, the present invention has aimed to propose a visible light communication device capable of increasing a probability that a receiving terminal can successfully receive a communication signal even if the receiving terminal simultaneously receives illuminating light from a plurality of lighting fixtures, yet having a simplified structure, a lighting fixture including the same, and a lighting system.

The visible light communication device according to one aspect of the present invention includes a control circuit configured to repeat a transmission process of transmitting a communication signal through modulating an intensity of visible light to be emitted from a light source. The control circuit is configured to, in the transmission process, arbitrarily select a time slot for transmission from a plurality of time slots set within a predetermined time period allocated to the transmission process, and transmit the communication signal in the time slot for transmission.

The figures depict one or more implementation in accordance with the present teaching, by way of example only, not by way of limitations.

DETAILED DESCRIPTION

The visible light communication device 1 of one embodiment in accordance with the present invention includes a control circuit 11. The control circuit 11 is configured to superpose a communication signal on illuminating light by modulating an intensity of the illuminating light outputted from a light source 3 constituted by at least one light emitting diode 30 (light emitting device). The control circuit 11 repeats a transmission process of dividing a constant time period into a plurality of time slots and outputting the communication signal in a time slot arbitrarily selected from the plurality of time slots.

Hereinafter, the visible light communication device 1 of the present embodiment is described with reference to the drawings. The visible light communication device 1 of the present embodiment is to be connected between a power source 2 and the light source 3, as shown in FIG. 1

The visible light communication device 1 of the present embodiment includes an impedance element 10, a switching element Q1, a control circuit 11, a control power supply circuit 12, a high frequency driving circuit 13, and an auxiliary circuit 14. Note that, the control power supply circuit 12, the high frequency driving circuit 13, and the auxiliary circuit 14 are optional.

The power source 2 is a constant current source to supply a constant load current (constant current) to the light source 3. In other words, the power source 2 keeps the load current at a preset value. For example, the power source 2 is constituted by a switching power source including a PFC (Power Factor Correction) circuit and a step-down converter. The power source 2 receives an alternating current, converts the received alternating current into a direct current, and outputs the direct current. In brief, the power source 2 is configured to supply the constant load current to the light source 3 by use of the AC voltage of the commercial power source AC1.

Figure 1:
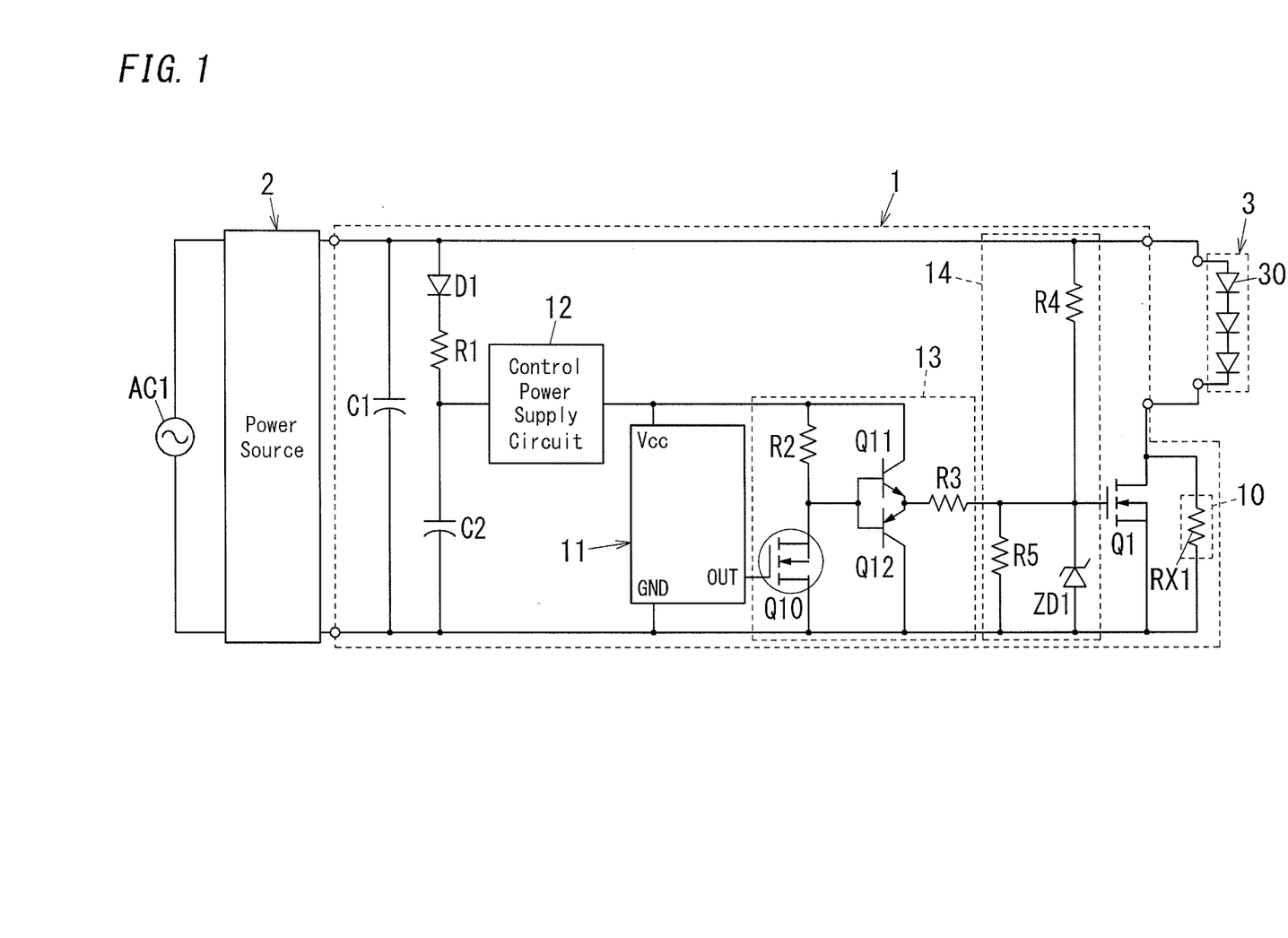
FIG. 1 is a schematic circuit diagram illustrating the visible light communication device of one embodiment in accordance with the present invention.

Note that, as shown in FIG. 1, there is a smoothing capacitor C1 connected between output terminals of the power source 2. This smoothing capacitor C1 can eliminate a ripple from the direct current outputted from the power source 2. This smoothing capacitor C1 is optional.

The light source 3 is configured to emit illuminating light (visible light). For example, as shown in FIG. 1, the light source 3 is a series circuit of the light emitting diodes 30. The light source 3 may be one light emitting diode 30. Note that, the light source 3 is not limited to the above structure, but may be a parallel circuit of series circuits of light emitting diodes 30, for example. In the visible light communication device 1 of the present embodiment, the light emitting device for constituting the light source 3 is the light emitting diode 30, but may not be limited to the light emitting diode 30, and, for example, may be another light emitting device such as an organic electroluminescence element (i.e., an OLED) and a semiconductor laser.

Figure 10:
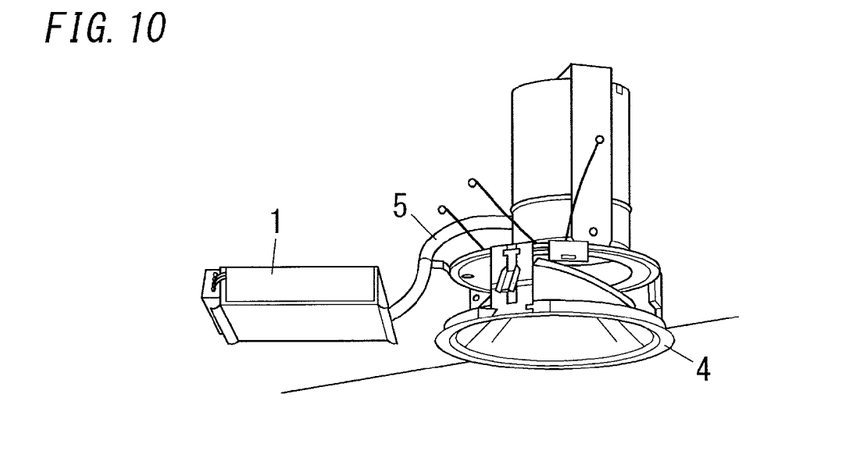
FIG. 10 is a schematic view illustrating a lighting fixture including the visible light communication device of the present embodiment.

The impedance element 10 includes an impedance device such as a resistor. As shown in FIG. 10, the impedance element 10 is connected in series with the light source 3. In other words, the impedance element 10 is connected between the power source 2 and the light source 3. In the visible light communication device 1 of the present embodiment, the impedance element 10 is constituted by a resistor RX1 serving as an impedance device.

The switching element Q1 is constituted by an N-channel MOSFET (Metal-Oxide-Semiconductor-Field-Effect-Transistor), as shown in FIG. 1. The switching element Q1 includes a gate for receiving the communication signal from the control circuit 11. As shown in FIG. 1, the switching element Q1 is connected in parallel with the impedance element 10. Consequently, while the switching element Q1 is in an on-state, the load current flows through the light source 3 without passing through the impedance element 10. In contrast, while the switching element Q1 is in an off-state, the load current flows through the light source 3 and the impedance element 10. In brief, while the switching element Q1 is in the on-state, the load current flows through a path having relatively low impedance. While the switching element Q1 is in the off-state, the load current flows through a path having relatively high impedance. When the switching element Q1 is turned on, accordingly the load current increases but is immediately decreased down to the preset value by the power source 2. In short, when the switching element Q1 is turned on, the load current increases temporarily. When the switching element Q1 is turned off, accordingly the load current decreases but is immediately increased up to the preset value by the power source 2. In short, when the switching element Q1 is turned off, the load current decreases temporarily. The load current varies in this manner, and therefore the intensity of the visible light also varies.

As shown in FIG. 1, the control circuit 11 is mainly constituted by a microcomputer including a CPU (Central Processing Unit) and a memory storing various types of programmes. In the control circuit 11, the CPU executes one or more programmes stored in the memory of the microcomputer to implement functions described later.

The control circuit 11 is configured to operate with a control voltage provided from the control power supply circuit 12. The control power supply circuit 12 is constituted by a DC/DC converter, for example. As shown in FIG. 1, the control power supply circuit 12 converts a voltage inputted from the power source 2 through a circuit constituted by a diode D1, a resistor R1, and a capacitor C2 into a control voltage of 5 V, and outputs the control voltage, for example.

The control circuit 11 outputs a communication signal that is a binary signal for visible light communication. Such a communication signal can be derived from digital data of predetermined information such as positional information of lighting fixtures in doors and device information such as product codes of lighting fixtures. For example, the communication signal is a binary signal alternating between a first level (e.g., a high level) and a second level (e.g., a low level).

In the visible light communication device 1 of the present embodiment, the communication signal is corresponding to digital data of the position information of the lighting fixture. When a receiving terminal (e.g., a mobile phone) carried by a user receives illuminating light on which the communication signal is superposed, the user can use information indicated by the communication signal. The communication signal is inputted into the switching element Q1 through the high frequency driving circuit 13 and the auxiliary circuit 14.

The control circuit 11 is configured to control the switching element Q1 to modulate the intensity of the visible light. The high frequency driving circuit 13 is configured to turn on and off the switching element Q1. The control circuit 11 is configured to output the communication signal to the high frequency driving circuit 13 to control the switching element Q1.

The high frequency driving circuit 13 is constituted by switching devices Q10 to Q12 and resistors R2 and R3, as shown in FIG. 1.

The switching device Q10 is an N-channel MOSFET, for example. The switching device Q10 includes a gate to receive the communication signal from the control circuit 11. Further, the switching device Q10 includes a drain connected to an output side of the control power supply circuit 12 by way of the resistor R2.

The switching device Q11 is an NPN transistor, and the switching device Q12 is a PNP transistor, for example. These switching devices Q11 and Q12 constitute a push-pull circuit. A base of each of the switching devices Q11 and Q12 is connected to a connection point of the resistor R2 and the drain of the switching device Q10. Further, the switching device Q11 includes a corrector connected to the output side of the control power supply circuit 12, and the switching device Q12 includes a corrector connected to a ground (GND). An emitter of each of the switching devices Q11 and Q12 is connected to the gate of the switching element Q1 through the resistor R3.

The auxiliary circuit 14 is constituted by a series circuit of resistors R4 and R5, and a zener diode ZD1 connected in parallel with the resistor R5, for example. The auxiliary circuit 14 is connected in parallel with the power source 2. A connection point of the resistor R4 and the zener diode ZD1 is connected to the gate of the switching element Q1.

Owing to the auxiliary circuit 14, the switching element Q1 is forcibly turned on even when the control circuit 11 fails to operate, for example. In short, the auxiliary circuit 14 is configured to keep the switching element Q1 in the on-state while the control circuit 11 does not control the switching element Q1. Hence, it is possible to prevent a continuous flow of the load current through the impedance element 10, and thus a decrease in the light output of the light source 3 can be suppressed.

Next, the visible light communication implemented by the visible light communication device 1 of the present embodiment is described. The visible light communication device 1 of the present embodiment performs the visible light communication by means of modulating the light intensity of the light source 3 with the communication signal.

In this visible light communication, a modulation scheme is 4 PPM (4-Pulse Position Modulation). According 4 PPM, a constant time period defined as a symbol duration is divided into four sequential slots, and a pulse is transmitted in any one of the slots. Thus, 2-bit data is transmitted. Detailed information of 4 PPM is disclosed in JEITA CP-1223 available from JEITA (Japan Electronics and Information Technology Industries Association). Note that, the modulation scheme used in the visible light communication device 1 of the present embodiment is not limited to 4 PPM.

In the present embodiment, the communication signal is a binary signal obtained by modulating digital data indicative of the predetermined information in a predetermined modulation scheme.

When the communication signal has the low level, the switching device Q10 is turned off, the switching device Q11 is turned on, and the switching device Q12 is turned off. Therefore a signal having a high level is inputted into the gate of the switching element Q1, and thus the switching element Q1 is turned on. Consequently the load current flows through the light source 3 without passing through the impedance element 10. When the communication signal has the high level, the switching device Q10 is turned on, the switching device Q11 is turned off, and the switching device Q12 is turned on. Therefore a signal having a low level is inputted into the gate of the switching element Q1, and thus the switching element Q1 is turned off. Consequently the load current flows through the light source 3 and the impedance element 10.

The high frequency driving circuit 13 is configured to turn on the switching element Q1 when the communication signal has the low level, and to turn off the switching element Q1 when the communication signal has the high level. Alternatively, the high frequency driving circuit 13 may be configured to turn on the switching element Q1 when the communication signal has the high level, and to turn off the switching element Q1 when the communication signal has the low level. In summary, the high frequency driving circuit 13 is configured to turn on the switching element Q1 when the communication signal has one of the first level (high level) and the second level (low level) and to turn off the switching element Q1 when the communication signal has the other of the first level and the second level.

As described above, the control circuit 11 turns on and off the switching element Q1 using the communication signal to modulate the light intensity of the light source 3, thereby conducting the visible light communication in which the communication signal is superposed on the illuminating light outputted from the light source 3.

The communication signal is based on a frame (see JEITA CP-1223) including a starting part (SOF) of 14 bits, an information part (payload) of 128 bits, an end part (EOF) of 16 bits. The start part stores a preamble indicative of a starting position of the frame, and a frame type indicative of a type of the payload. The payload stores ID data indicative of information such as the positional information and the device information. The end part includes a CRC (Cyclic Redundancy Check) for allowing a receiving terminal to check whether the receiving terminal receives data normally.

The control circuit 11 is configured to repeat the transmission process of transmitting the communication signal through modulating the intensity of the visible light to be emitted from the light source 3. Additionally, the control circuit 11 is configured to, in the transmission process, arbitrarily select a time slot for transmission from a plurality of time slots set within a predetermined time period allocated to the transmission process, and transmit the communication signal in the time slot for transmission. Further, the control circuit 11 is configured to, in the transmission process, not transmit the communication signal in the plurality of time slots except the time slot for transmission.

In summary, the control circuit 11 repeats periodically the transmission process of outputting the communication signal in a time slot arbitrarily (randomly) selected from the plurality of time slots constituting the constant time period (duration). Note that, one period of the transmission process may be defined as a "super frame".

The visible light communication device 1 of the present embodiment uses, as a scheme of selecting the time slot, a scheme of generating a pseudorandom number by use of an algorithm for generating a pseudorandom number and selecting a time slot based on the generated pseudorandom number. For example, the control circuit 11 stores an algorithm for generating a pseudorandom number based on a seed value.

The control circuit 11 is configured to generate a pseudorandom number through the algorithm, and select the time slot for transmission from the plurality of time slots based on the generated pseudorandom number.

Figure 2:
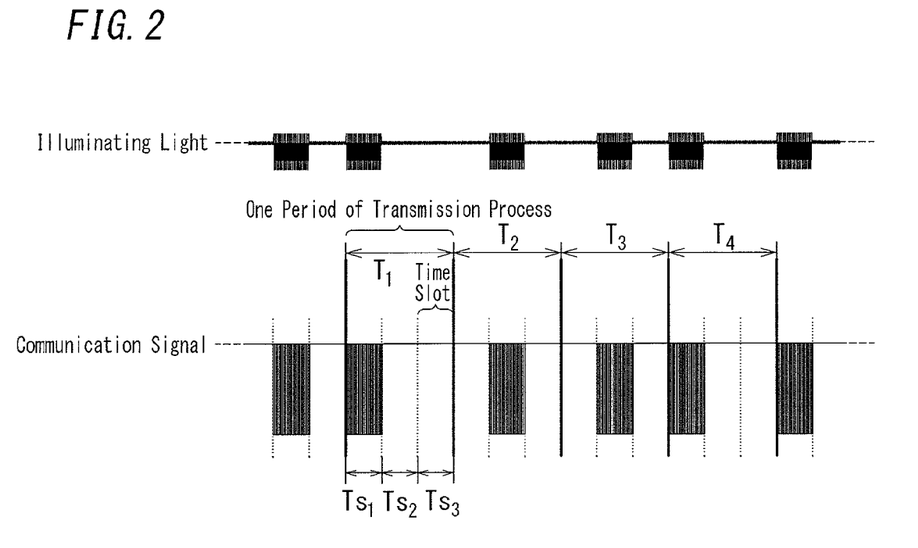
FIG. 2 is a waveform chart illustrating the illuminating light and the communication signal of the visible light communication device of the embodiment.

FIG. 2 shows an example in which the number of time slots per one period of the transmission process is three. In this example, in each period, the control circuit 11 selects one time slot from the three time slots Ts1, Ts2, and Ts3 arbitrarily (at random), and outputs the communication signal in the selected time slot (time slot for transmission). For instance, in the transmission process of a time period T1, the control circuit 11 transmits the communication signal in the first time slot Ts1. In the transmission process of a time period T2, the control circuit 11 transmits the communication signal in the second time slot Ts2. In the transmission process of a time period T3, the control circuit 11 transmits the communication signal in the second time slot Ts2. In the transmission process of a time period T4, the control circuit 11 transmits the communication signal in the first time slot Ts1.

Figure 3:
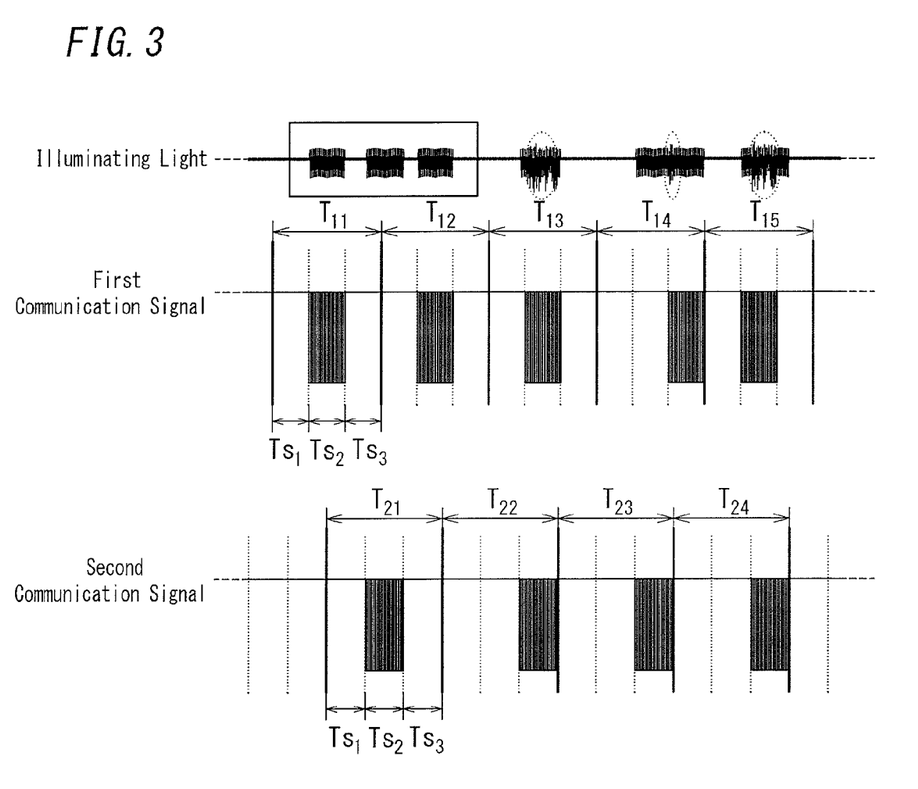
FIG. 3 is a waveform chart illustrating the illuminating light and the communication signals of the two lighting fixtures each including the visible light communication device of the embodiment.

FIG. 3 shows another example in which irradiation areas of illuminating light of two lighting fixtures (not shown) each including the visible light communication device 1 of the present embodiment overlap each other.

In the example shown in FIG. 3, the first lighting fixture of the two lighting fixtures transmits the communication signals (first communication signals) individually in the second time slot Ts2 of a time period T11, the second time slot Ts2 of a time period T12, the second time slot Ts2 of a time period T13, the third time slot Ts3 of a time period T14, and the second time slot Ts2 of a time period T15. The second lighting fixture of the two lighting fixtures transmits the communication signals (second communication signals) individually in the second time slot Ts2 of a time period T21, the third time slot Ts3 of a time period T22, the third time slot Ts3 of a time period T23, and the third time slot Ts3 of a time period T24.

In this example, the transmission signal in the period T21 does not interfere with the transmission signals in the time periods T11 and T12. However, the transmission signal in the period T22 interferes with the transmission signal in the time period T13, the transmission signal in the period T23 interferes with the transmission signal in the time period T14, and the transmission signal in the period T24 interferes with the transmission signal in the time period T15.

As described above, in the example shown in FIG. 3, in each time period indicated by a circle of a broken line, the waveform of illuminating light shows an interference between the first transmission signal and the second transmission signal. However, in a time period indicated by a rectangle of a solid line, there is no interference between the first communication signal and the second communication signal. Accordingly, in the time period indicated by the rectangle of the solid line, a receiving terminal (not shown) can successfully receive the communications signals individually transmitted from the two lighting fixtures.

Figure 4:
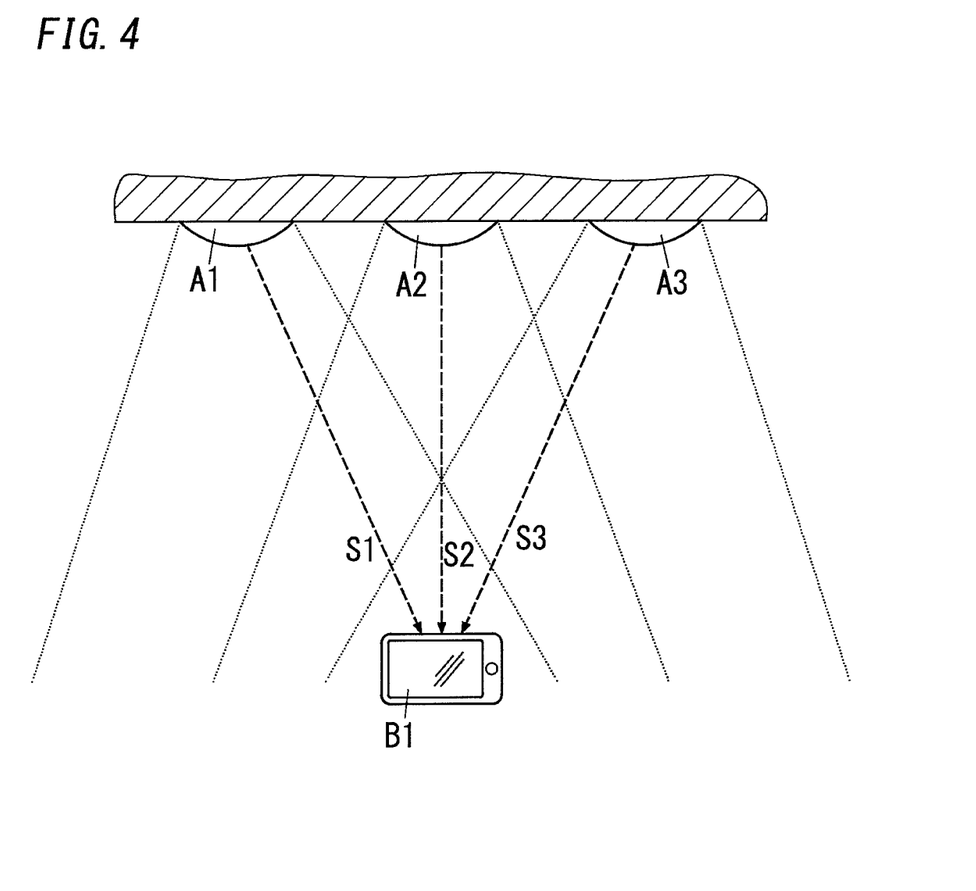
FIG. 4 is a schematic diagram illustrating a lighting system including three lighting fixtures each including the visible light communication device of the embodiment.

Another example is described with reference to FIG. 4 and FIG. 5. FIG. 4 shows a lighting system including a plurality of (three, in this example) lighting fixtures A1 to A3. Each of the lighting fixtures A1 to A3 includes the visible light communication device 1 of the present embodiment, and is situated on a ceiling. It is assumed that a receiving terminal B1 (e.g., a mobile phone) receives the communication signals at a position where irradiation areas of illuminating light from the lighting fixtures A1 to A3 overlap each other.

Figure 5:
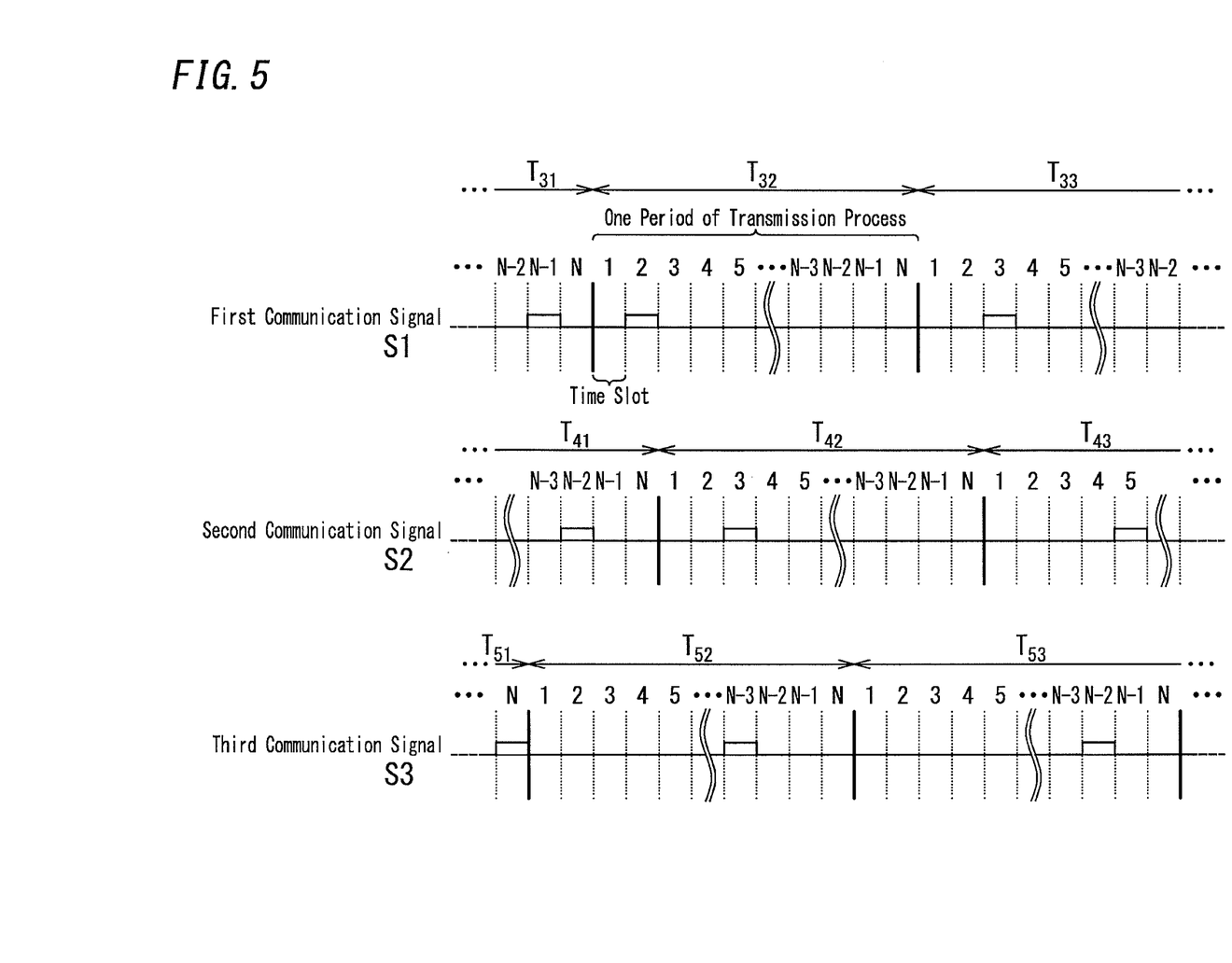
FIG. 5 is a waveform chart illustrating the communication signals of the lighting system shown in FIG. 4.

Note that, as shown in FIG. 5, the communication signal transmitted from the lighting fixture A1, the communication signal transmitted from the lighting fixture A2, and the communication signal transmitted from the lighting fixture A3 are referred to as the first communication signal S1, the second communication signal S2, and the third communication signal S3, respectively. Further, it is assumed that the number of time slots per one period of the transmission process is N.

As shown in FIG. 5, the first communication signals S1 are respectively transmitted in the (N-1)th time slot of the first period (time period T31), the second time slot of the second period (time period T32), and the third time slot of the third period (time period T33).

The second communication signals S2 are respectively transmitted in the (N-2)th time slot of the first period (time period T41), the third time slot of the second period (time period T42), and the fifth time slot of the third period (time period T43).

The third communication signals S3 are respectively transmitted in the Nth time slot of the first period (time period T51), the (N-3)th time slot of the second period (time period T52), and the (N-2)th time slot of the third period (time period T53).

As shown in FIG. 5, timings at which the communication signals S1 to S3 are transmitted do not coincide with each other. Therefore, the communication signals S1 to S3 do not interfere with each other, and thus the receiving terminal B1 can successfully receive the communication signals S1 to S3 even when the receiving terminal B1 is at a position where the irradiation areas of the illuminating light from the lighting fixtures A1 to A3 overlap each other. The shown example is an ideal case, and there would be a possibility that the communication signals S1 to S3 interfere with each other like the example shown in FIG. 3. However, in contrast to an instance where the communication signals are successively transmitted like the background art, the visible light communication device 1 of the present embodiment can increase a possibility that the communication signal is successfully received in a case where the irradiation areas of the illuminating light from the plurality of lighting fixtures overlap each other.

The following explanations are made to a result of simulation and a result of measurement regarding a system including four lighting fixtures (not shown) each employing the visible light communication device 1 of the present embodiment under a condition where the number of time slots per one period of the transmission process is set to six.

Figure 6:
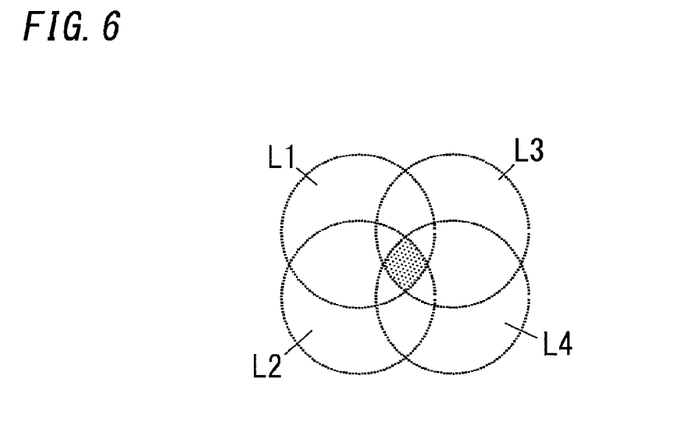
FIG. 6 is a diagram illustrating the irradiation areas of the illuminating light of the lighting fixtures relating to simulation and measurement for four lighting fixtures each including the visible light communication device of the embodiment.

As shown in FIG. 6, the measurement was conducted at a position (shaded part in the same figure) in which irradiated areas L1 to L4 of illuminating light from the lighting fixtures overlap each other. In this measurement, an intensity of each illuminating light was measured by a photodiode receiver, and was displayed on a screen in real time. The result was obtained from images taken by a video camera (not shown).

Figure 7:
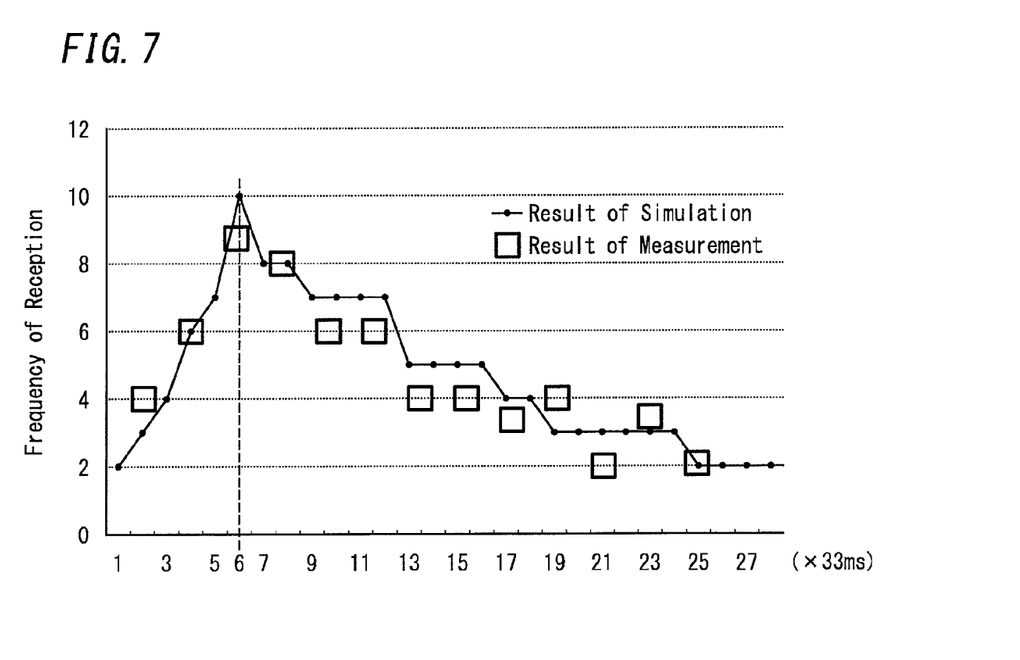
FIG. 7 is a graph showing results of the simulation and the measurement.

FIG. 7 shows a graph indicating the results of the simulation and the measurement. In the same figure, the result of the simulation is designated by a polygonal line, and the result of the measurement is designated by squares.

Note that, the video camera used for the above measurement of data has a frame rate of 30 fps. Additionally, in the above measurement of data, the frame is defined based on JEITA CP-1223, and therefore one frame has a length of 158 bits (14 bits for SOF, 128 bits for payload, and 16 bits for EOF). The bit rate is 4.8 kbs, and thus the length of one frame is 33 ms. Accordingly, the measurement time on a lateral axis shown in FIG. 7 is represented by the number of frames multiplied by 33 ms (i.e., a multiple of 33 ms). Further, a vertical axis shown in FIG. 7 denotes the number of times of successfully receiving the communication signal per unit time, that is, a frequency of reception.

As apparent from FIG. 7, the result of the measurement almost coincides with the result of the simulation. With regard to the result of the simulation, the frequency of reception is "2" after a lapse of a time period corresponding to one frame (=33 ms), and the frequency of reception increases with time until a time period corresponding to six frames (=198 ms) elapses. After the lapse of the time period corresponding to six frames, the frequency of reception decreases with time.

The above measurement was continued for 100 seconds. The total number of times of successfully receiving the communication signal from any one of the lighting fixtures is 191. The result of the measurement shows that the communication signal can be successfully received at an average rate of one per 0.52 seconds.

The visible light communication device 1 of the present embodiment described above includes the control circuit 11. The control circuit 11 is configured to superpose the communication signal on the illuminating light by modulating the intensity of the illuminating light outputted from the light source 3 constituted by at least one light emitting device 30. The control circuit 11 repeats the transmission process of dividing the constant time period into the plurality of time slots and outputting the communication signal in a time slot arbitrarily selected from the plurality of time slots.

As described above, in the visible light communication device 1 of the present embodiment, the control circuit 11 repeats the transmission process of dividing the constant time period into the plurality of time slots and outputting the communication signal in a time slot arbitrarily selected from the plurality of time slots. Consequently, the visible light communication device 1 of the present embodiment is capable of increasing a probability that a receiving terminal can successfully receive a communication signal even if the receiving terminal simultaneously receives illuminating light from a plurality of lighting fixtures, yet having a simplified structure.

For example, a technique of setting a communication scheme so that interference of bidirectional communication signals is avoided, which is used in fiber optic bidirectional communication, is available for the visible light communication device. However, when such a method is used, the control circuit to perform the scheme becomes complicated. Whereas, according to the visible light communication device 1 of the present embodiment, it is sufficient that the control circuit 11 performs a simple scheme of repeating the transmission process of dividing the constant time period into the plurality of time slots and outputting the communication signal in a time slot arbitrarily selected from the plurality of time slots. Hence, the visible light communication device 1 of the present embodiment does not need the complicated control circuit 11.

As described above, the control circuit 11 generates the pseudorandom number by use of the algorithm for generating the pseudorandom number, and selects a time slot based on the generated pseudorandom number. However, in a case where the lighting fixtures may individually include the visible light communication devices 1 of the present embodiment, when each control circuit 11 uses the same seed value for generating the pseudorandom number, the generated pseudorandom numbers are same. This may unfortunately cause an increase in a probability of interference of the communication signals.

In view of this, it is preferable that the control circuit 11 be configured to select, as the seed value for the pseudorandom number used in the algorithm, a unique value allocated to the corresponding visible light communication device 1 such as unique positional ID stored in the memory of the control circuit 11. In other words, the control circuit 11 stores the unique value uniquely allocated to the visible light communication device 1. The control circuit 11 is configured to use the unique value as the seed value.

In summary, in the visible light communication device 1 of the present embodiment, the control circuit 11 selects the time slot depending on the pseudorandom number generated by the algorithm for generating the pseudorandom number, and the seed value used in the algorithm is set to the unique value exclusively allocated to the visible light communication device 1.

According to this configuration, the algorithms of the individual visible light communication devices 1 do not use the same seed value, and therefore the generated pseudorandom numbers are different from each other. Thus, the probability of interference of the communication signals can be reduced. Moreover, according to this configuration, to set the seed value for the pseudorandom number, there is no need to use a further component such as a timer and a component to obtain an analog value for generating a random number.

Note that, according to the visible light communication device 1 of the present embodiment, the period of the transmission process is not synchronized but may be synchronized.

Figure 9:
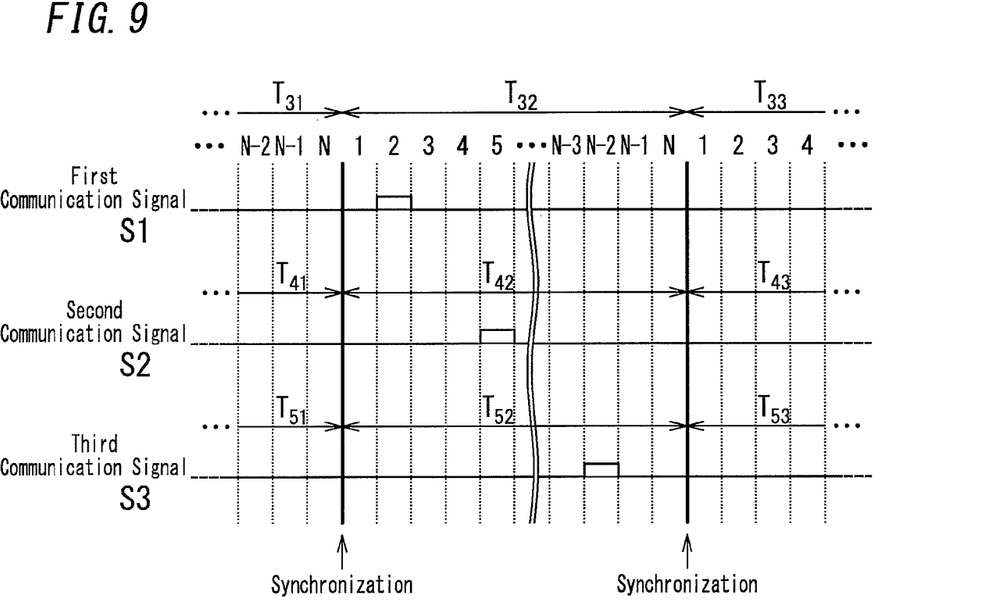
FIG. 9 is a waveform chart illustrating the communication signals of the lighting system including three lighting fixtures each including the visible light communication device of the modification.

For example, as shown in FIG. 9, the period of the transmission process may be synchronized with a period of the AC voltage of the commercial power source AC1.

In FIG. 9, the communication signal transmitted from the lighting fixture A1, the communication signal transmitted from the lighting fixture A2, and the communication signal transmitted from the lighting fixture A3 are referred to as the first communication signal S1, the second communication signal S2, and the third communication signal S3, respectively. Further, it is assumed that the number of time slots per one period of the transmission process is N.

As shown in FIG. 9, the period (T31, T32, T33, . . . ) of the lighting fixture A1, the period (T41, T42, T43, . . . ) of the lighting fixture A2, the period (T51, T52, T53, . . . ) of the lighting fixture A3 coincide with each other.

The first communication signal S1 is transmitted in the second time slot of the time period T32. The second communication signal S2 is transmitted in the fifth time slot of the time period T42 coinciding with the time period T32. The third communication signal S3 is transmitted in the (N-2)th time slot of the time period T52 coinciding with the time period T32.

Figure 8:
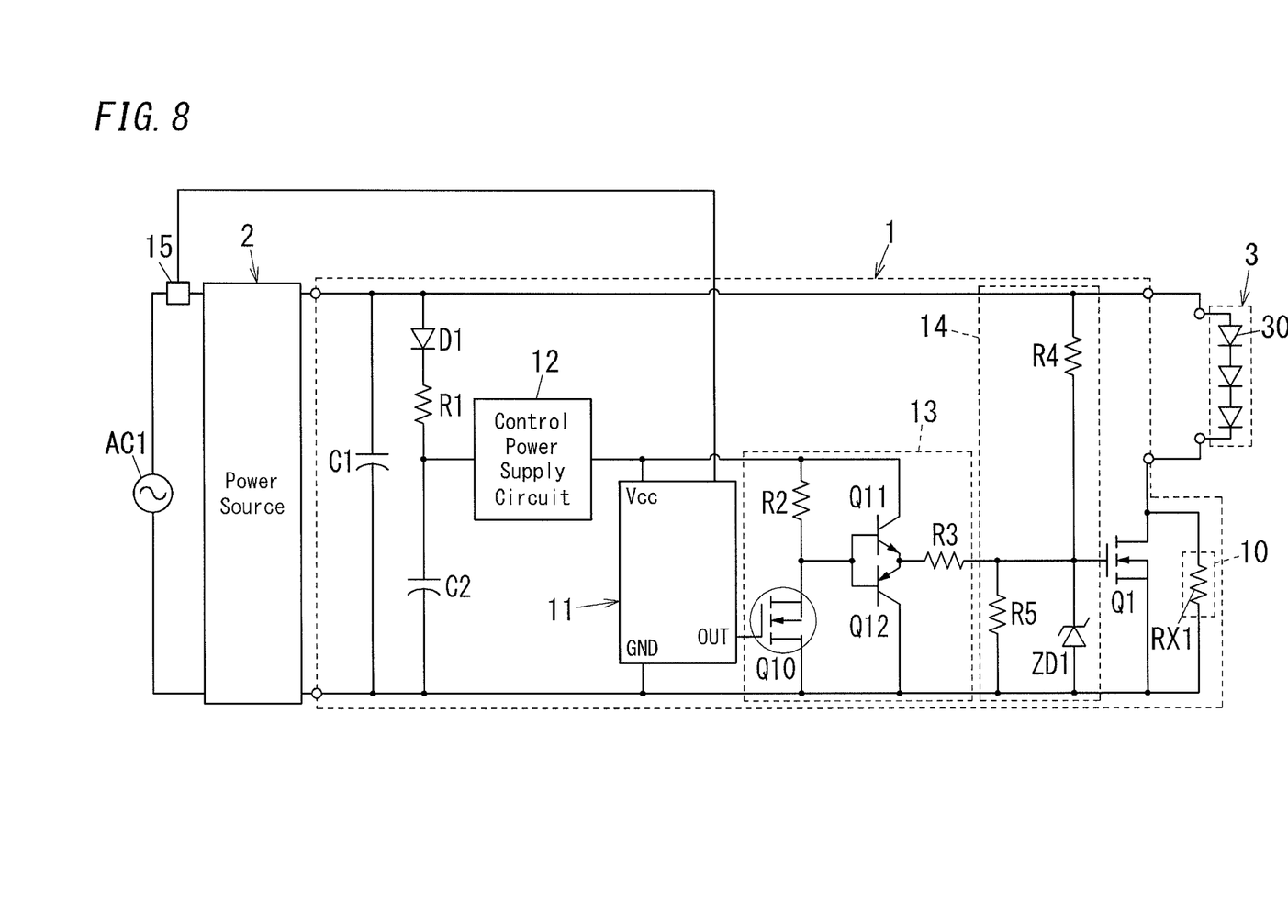
FIG. 8 is a schematic circuit diagram illustrating the visible light communication device of a modification of the embodiment.

FIG. 8 shows the visible light communication device 1 of a modification of the present embodiment that enables synchronization of the transmission process as described above. In the visible light communication device 1 of the modification, the control circuit 11 is configured to synchronize the period of the transmission process with the period of the AC voltage of the commercial power source AC1.

Additionally, the visible light communication device 1 of the modification includes a detection circuit 15 configured to detect the period of the AC voltage of the commercial power source AC1. The control circuit 11 is configured to synchronize the period of the transmission process with the period of the AC voltage of the commercial power source detected by the detection circuit 15.

For example, the detection circuit 15 is configured to detect a zero crossing of the AC voltage of the commercial power source AC1. The control circuit 11 is configured to start the transmission process in synchronization with the zero crossing detected by the detection circuit 15. In other words, the when the zero crossing is detected by the detection circuit 15, the control circuit 11 starts to time the period of the transmission process.

According to this configuration, it is possible to more decrease the number of times of interference of the communication signals, compared with a comparative example in which the period of the transmission process is not synchronized. Additionally, in this configuration, the synchronization of the communication signal is made based on the period the AC voltage from the commercial power source AC1 that is a common power source connected to the individual visible light communication devices 1, and therefore there is no need to use an additional circuit to provide a synchronization signal. Consequently, the configuration for such synchronization can be produced at a lowered cost.

Note that, a device for determining the period of the AC voltage of the commercial power source AC1 is well known and an explanation of such a device is omitted. For example, the period of the AC voltage of the commercial power source AC1 can be determined by detecting the zero crossing of the AC voltage of the commercial power source AC1.

If the power source 2 is a constant voltage source, a difference between an average of the load current flowing through the light source 3 in a period in which the communication signal is superposed on the illuminating light and an average of the load current flowing through the light source 3 in a period in which the communication signal is not superposed on the illuminating light is likely to increase. For this reason, when the communication signals are outputted so that the above two periods alternate at a frequency of about 30 Hz, an undesired blink of the light source 3 may occur.

In view of this, the visible light communication device 1 of the present embodiment includes the power source 2 configured to supply the constant load current to the light source 3, the impedance element 10 connected in series with the light source 3, and the switching device Q10 connected in parallel with the impedance element 10 to select whether the load current flowing through the light source 3 also flows through the impedance element 10. The control circuit 11 turns on and off the switching element Q1 to modulate the light intensity of the illuminating light outputted from the light source 3, thereby superposing the communication signal on the illuminating light.

In other words, in the visible light communication device 1 of the present embodiment, the power source 2 is a constant current power source and the light intensity of the light source 3 is modulated by selecting, by turning on and off the switching device Q10, whether the load current flowing through the light source 3 also flows through the impedance element 10. According to this circuit configuration, the average of the load current in the period in which the communication signal is superposed on the illuminating light is substantially equal to the average of the load current in the period in which the communication signal is not superposed on the illuminating light. Hence, even when so-called burst control is performed, there is no substantial difference between the averages of the load current flowing through the light source 3. Consequently, the visible light communication device 1 of the present embodiment can suppress occurrence of an undesired blink of the light source 3.

Figure 11:
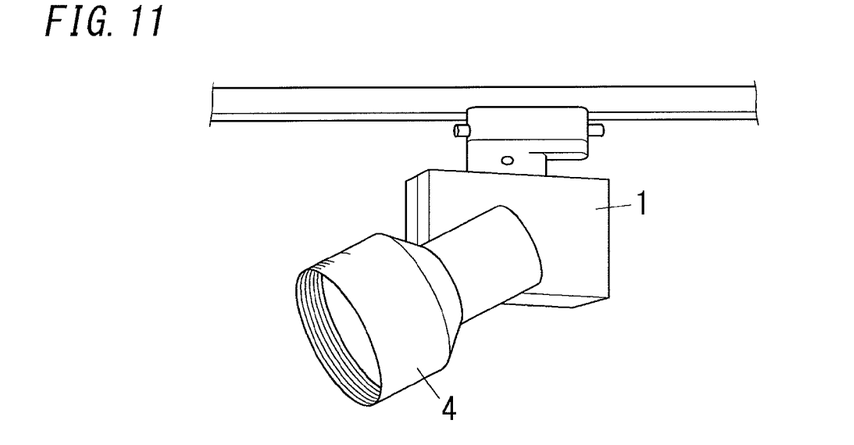
FIG. 11 is a schematic view illustrating a lighting fixture including the visible light communication device of the present embodiment.
Figure 12:
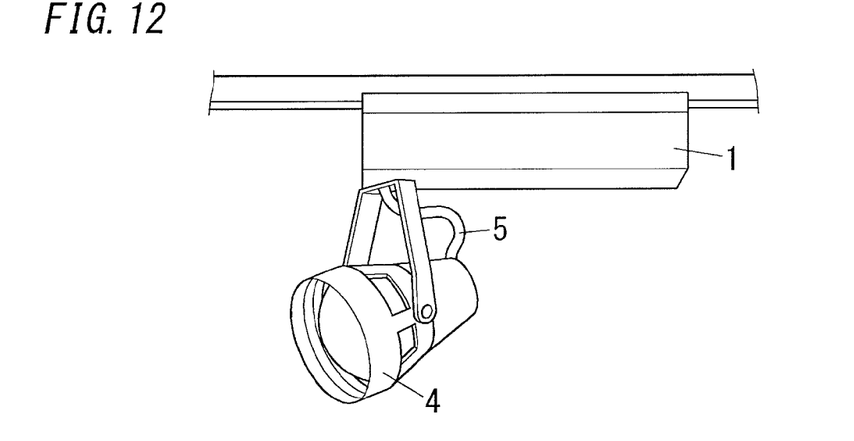
FIG. 12 is a schematic view illustrating a lighting fixture including the visible light communication device of the present embodiment.

The visible light communication device 1 of the present embodiment may be used in a lighting fixture such as lighting fixtures shown in FIG. 10 to FIG. 12, for example.

Each of the lighting fixtures shown in FIG. 10 to FIG. 12, which are in conformity with the present embodiment of the present invention, includes the visible light communication device 1 of the present embodiment and a fixture body 4 for holding the light source 3. Note that, the lighting fixture shown in FIG. 10 is a down light, and the lighting fixtures shown in FIG. 11 and FIG. 12 are spot lights. In the lighting fixtures shown in FIG. 10 and FIG. 12, the visible light communication device 1 is connected to the light source 3 through a cable 5.

Additionally, the lighting fixture described above may be used alone but a plurality of lighting fixtures described above may be used to constitute a lighting system. For example, as shown in FIG. 4, the lighting system in accordance with the present embodiment of the present invention may be constituted by a plurality of (three in the figure) lighting fixtures A1 to A3. In short, this lighting system includes the plurality of lighting fixtures.

With regard to the lighting system constituted by the plurality of lighting fixtures, it is preferable that the number of time slots per one period of the transmission process be greater than the number of lighting fixtures whose rays of illuminating light are likely to interfere with each other. In short, in the lighting system, the number of time slots of each of the plurality of lighting fixtures is bigger than the number of plurality of lighting fixtures. For example, when rays of illuminating light emitted from up to five lighting fixtures may interfere with each other at any position, the number of time slots is preferably greater than five.

As clearly understood from the embodiment described above, the visible light communication device (1) of the first aspect in accordance with the present invention includes a control circuit (11) configured to repeat a transmission process of transmitting a communication signal through modulating an intensity of visible light to be emitted from a light source (3). The control circuit (11) is configured to, in the transmission process, arbitrarily select a time slot for transmission from a plurality of time slots set within a predetermined time period allocated to the transmission process, and transmit the communication signal in the time slot for transmission.

According to the first aspect, the control circuit (11) periodically repeats the transmission process. In the transmission process, the control circuit 11 divides the constant time period into the plurality of time slots and outputs the communication signal in a time slot arbitrarily selected from the plurality of the time slots. Consequently, according to the first aspect, the visible light communication device is capable of increasing a probability that a receiving terminal can successfully receive a communication signal even if the receiving terminal simultaneously receives illuminating light from a plurality of lighting fixtures, yet having a simplified structure.

In the visible light communication device (1) according to the second aspect of the present invention, depending on the first aspect, the control circuit (11) is configured to, in the transmission process, not transmit the communication signal in the plurality of time slots except the time slot for transmission.

In the visible light communication device (1) according to the third aspect of the present invention, depending on the first or second aspect, the visible light communication device (1) further includes: an impedance element (10) connected between a power source (2) configured to supply a constant load current to the light source (3) and the light source (3); and a switching element (Q1) connected in parallel with the impedance element (10). The control circuit (11) is configured to control the switching element (Q1) to modulate the intensity of the visible light.

In the visible light communication device (1) according to the fourth aspect of the present invention, depending on the third aspect, the visible light communication device (1) further includes a high frequency driving circuit (13) configured to turn on and off the switching element (Q1). The control circuit (11) is configured to output the communication signal to the high frequency driving circuit (13) to control the switching element (Q1). The communication signal is a binary signal alternating between a first level and a second level. The high frequency driving circuit (13) is configured to turn on the switching element (Q1) when the communication signal has one of the first level and the second level and to turn off the switching element (Q1) when the communication signal has the other of the first level and the second level.

In the visible light communication device (1) according to the fifth aspect of the present invention, depending on the third or fourth aspect, the visible light communication device (1) further includes an auxiliary circuit (14) configured to keep the switching element (Q1) in an on-state while the control circuit (11) does not control the switching element (Q1).

In the visible light communication device (1) according to the sixth aspect of the present invention, depending on any one of the first to fifth aspects, the control circuit (11) stores an algorithm for generating a pseudorandom number based on a seed value. The control circuit (11) is configured to, in the transmission process, generate a pseudorandom number through the algorithm, and select the time slot for transmission based on the generated pseudorandom number. The control circuit (11) stores a unique value uniquely allocated to the visible light communication device (1). The control circuit (11) is configured to use the unique value as the seed value.

In the visible light communication device (1) according to the seventh aspect of the present invention, depending on the first or second aspect, the control circuit (11) is configured to synchronize a period of the transmission process with a period of an AC voltage of a commercial power source (AC1).

In the visible light communication device (1) according to the eighth aspect of the present invention, depending on the seventh aspect, the visible light communication device (1) further includes a detection circuit (15) configured to detect a period of the AC voltage of the commercial power source (AC1). The control circuit (11) is configured to synchronize the period of the transmission process with the period of the AC voltage of the commercial power source (AC1) detected by the detection circuit (15).

In the visible light communication device (1) according to the ninth aspect of the present invention, depending on the eighth aspect, the detection circuit (15) is configured to detect a zero crossing of the AC voltage of the commercial power source (AC1). The control circuit (11) is configured to start the transmission process in synchronization with the zero crossing detected by the detection circuit (15).

In the visible light communication device (1) according to the tenth aspect of the present invention, depending on any one of the seventh to ninth aspects, the visible light communication device (1) is to be connected between the light source (3) and a power source (2) configured to supply a constant load current to the light source (3) by use of the AC voltage of the commercial power source (AC1).

In the visible light communication device (1) according to the eleventh aspect of the present invention, depending on the tenth aspect, the visible light communication device (1) further includes: an impedance element (10) connected between the power source (2) and the light source (3); and a switching element (Q1) connected in parallel with the impedance element (10). The control circuit (11) is configured to control the switching element (Q1) to modulate the intensity of the visible light.

In the visible light communication device (1) according to the twelfth aspect of the present invention, depending on the eleventh aspect, the visible light communication device (1) further includes a high frequency driving circuit (13) configured to turn on and off the switching element (Q1). The control circuit (11) is configured to output the communication signal to the high frequency driving circuit (13) to control the switching element (Q1). The communication signal is a binary signal alternating between a first level and a second level. The high frequency driving circuit (13) is configured to turn on the switching element (Q1) when the communication signal has one of the first level and the second level and to turn off the switching element (Q1) when the communication signal has the other of the first level and the second level.

In the visible light communication device (1) according to the thirteenth aspect of the present invention, depending on the eleventh or twelfth aspect, the visible light communication device (1) further includes an auxiliary circuit (14) configured to keep the switching element (Q1) in an on-state while the control circuit (11) does not control the switching element (Q1).

In the visible light communication device (1) according to the fourteenth aspect of the present invention, depending on any one of the seventh to thirteenth aspects, the control circuit (11) stores an algorithm for generating a pseudorandom number based on a seed value. The control circuit (11) is configured to, in the transmission process, generate a pseudorandom number through the algorithm, and select the time slot for transmission based on the generated pseudorandom number. The control circuit (11) stores a unique value uniquely allocated to the visible light communication device (1). The control circuit (11) is configured to use the unique value as the seed value.

The lighting fixture according to the fifteenth aspect of the present invention, includes: a fixture body (4) to hold a light source (3) to emit visible light; and a visible light communication device (1) to perform visible light communication using the light source (3). The visible light communication device (1) is according to any one of the first to fourteenth aspects.

In the lighting system according to the sixteenth aspect in accordance with the present invention, includes a plurality of lighting fixtures (A1, A2, A3, . . . ). Each of the plurality of lighting fixtures is according to the fifteenth aspect.

In the lighting system according to the seventeenth aspect in accordance with the present invention, depending on the sixteenth aspect, the number of time slots of each of the plurality of lighting fixtures is bigger than the number of plurality of lighting fixtures.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:
1. A visible light communication device, comprising:
a control circuit configured to repeat a transmission process of transmitting a communication signal through modulating an intensity of visible light to be emitted from a light source,
the control circuit being configured to, in the transmission process, arbitrarily select a time slot for transmission from a plurality of time slots set within a predetermined time period allocated to the transmission process, and transmit the communication signal in the time slot for transmission, the control circuit stores an algorithm for generating a pseudorandom number based on a seed value;

the control circuit is configured to, in the transmission process, generate a pseudorandom number through the algorithm, and select the time slot for transmission based on the generated pseudorandom number;

the control circuit stores a unique value uniquely allocated to the visible light communication device; and the control circuit is configured to use the unique value as the seed value.

2. The visible light communication device according to claim 1, wherein the control circuit is configured to, in the transmission process, not transmit the communication signal in the plurality of time slots except the time slot for transmission.

3. The visible light communication device according to claim 1, further comprising:

an impedance element connected between a power source for supplying a constant load current to the light source and the light source; and a switching element connected in parallel with the impedance element, wherein the control circuit is configured to control the switching element to modulate the intensity of the visible light.

4. The visible light communication device according to claim 3, further comprising a high frequency driving circuit configured to turn on and off the switching element, wherein:

the control circuit is configured to output the communication signal to the high frequency driving circuit to control the switching element;

the communication signal is a binary signal alternating between a first level and a second level, and the high frequency driving circuit is configured to turn on the switching element when the communication signal has one of the first level and the second level and to turn off the switching element when the communication signal has the other of the first level and the second level.

5. The visible light communication device according to claim 3, further comprising an auxiliary circuit configured to keep the switching element in an on-state while the control circuit does not control the switching element.

6. The visible light communication device according to claim 1, wherein the control circuit is configured to synchronize a period of the transmission process with a period of an AC voltage of a commercial power source.

7. The visible light communication device according to claim 6, further comprising a detection circuit configured to detect a period of the AC voltage of the commercial power source, wherein the control circuit is configured to synchronize the period of the transmission process with the period of the AC voltage of the commercial power source detected by the detection circuit.

8. The visible light communication device according to claim 7, wherein:

the detection circuit is configured to detect a zero crossing of the AC voltage of the commercial power source; and the control circuit is configured to start the transmission process in synchronization with the zero crossing detected by the detection circuit.

9. The visible light communication device according to claim 6, wherein the visible light communication device is to be connected between the light source and a power source configured to supply a constant load current to the light source by use of the AC voltage of the commercial power source.

10. The visible light communication device according to claim 9, further comprising:

an impedance element connected between the power source and the light source; and a switching element connected in parallel with the impedance element, wherein the control circuit is configured to control the switching element to modulate the intensity of the visible light.

11. The visible light communication device according to claim 10, further comprising a high frequency driving circuit configured to turn on and off the switching element, wherein:

the control circuit is configured to output the communication signal to the high frequency driving circuit to control the switching element;

the communication signal is a binary signal alternating between a first level and a second level, and the high frequency driving circuit is configured to turn on the switching element when the communication signal has one of the first level and the second level and to turn off the switching element when the communication signal has the other of the first level and the second level.

12. The visible light communication device according to claim 10, further comprising an auxiliary circuit configured to keep the switching element in an on-state while the control circuit does not control the switching element.

13. A lighting fixture comprising:

a fixture body to hold a light source to emit visible light; and a visible light communication device to perform visible light communication using the light source, the visible light communication device being according to claim 1.

14. A lighting system comprising a plurality of lighting fixtures, each of the plurality of lighting fixtures being according to claim 13.

15. The lighting system according to claim 14, wherein the number of time slots of each of the plurality of lighting fixtures is bigger than the number of plurality of lighting fixtures.

* * * * *